United States Patent
Naito et al.

(10) Patent No.: US 6,735,455 B2
(45) Date of Patent: May 11, 2004

(54) PORTABLE INFORMATION TERMINAL AND POWER SUPPLY CONTROL METHOD THEREFOR

(75) Inventors: Kosuke Naito, Tokyo (JP); Syuji Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 497 days.

(21) Appl. No.: 09/739,875

(22) Filed: Dec. 20, 2000

(65) Prior Publication Data

US 2001/0005686 A1 Jun. 28, 2001

(30) Foreign Application Priority Data

Dec. 27, 1999 (JP) ............................................. 11-371726

(51) Int. Cl.[7] .............................. H04B 1/38; H04M 1/00
(52) U.S. Cl. .................... 455/574; 455/343.1; 455/572; 455/567
(58) Field of Search .............................. 455/574, 343.1, 455/555, 572, 573, 571, 566, 567, 556.2, 343.2, 343.15, 343.5, 343.6

(56) References Cited

U.S. PATENT DOCUMENTS

| | | | |
|---|---|---|---|
| 5,519,757 A | * | 5/1996 | Torin .......................... 455/574 |
| 5,602,805 A | | 2/1997 | Chigita |
| 5,914,585 A | | 6/1999 | Grabon |
| 5,959,368 A | | 9/1999 | Kubo et al. |
| 6,029,074 A | * | 2/2000 | Irvin .......................... 455/571 |
| 6,212,410 B1 | * | 4/2001 | Ishida ........................ 455/572 |
| 2002/0028701 A1 | * | 3/2002 | Satoh et al. ................ 455/574 |

FOREIGN PATENT DOCUMENTS

| | | |
|---|---|---|
| EP | 0 660 485 A2 | 6/1995 |
| GB | 2 281 458 A | 1/1995 |
| GB | 2 326 062 A | 9/1998 |
| JP | 7-281798 | 10/1995 |
| JP | 8-161088 | 6/1996 |
| JP | 9-205396 | 8/1997 |
| JP | 10-304578 | 11/1998 |
| JP | 11-184576 | 7/1999 |
| JP | 11-214043 | 8/1999 |
| KR | 99-43019 | 6/1999 |

OTHER PUBLICATIONS

Korean Office Action dated Nov. 29, 2002, with Partial English Translation.
European Search Report dated May 23, 2001.
Japanese Office Action dated Jun. 10, 2003 with a partial English translation.

* cited by examiner

Primary Examiner—Nay Maung
Assistant Examiner—John J Lee
(74) Attorney, Agent, or Firm—McGinn & Gibb, PLLC

(57) ABSTRACT

This invention relates to a portable information terminal having a plurality of functions such as a radio communication terminal unit, a data processing terminal unit, a digital camera unit, etc. The portable information terminal comprises a plurality of function processing units which respectively perform the functions; a battery which supplies electric power to the function processing units; a remaining battery charge detecting unit which detects remaining battery charge of the battery; and a power supply control unit. This power supply control unit compares the remaining battery charge with each of power supply limiting values determined in advance with respect to the function processing units, and, when the remaining battery charge becomes lower than at least one of the power supply limiting values of the function processing units, the power supply control unit stops power supply to the at least one of the function processing units and/or outputs warning signals.

18 Claims, 3 Drawing Sheets

PORTABLE INFORMATION TERMINAL AND POWER SUPPLY CONTROL METHOD THEREFOR

BACKGROUND OF THE INVENTION

1. Field of the Invention

The present invention relates to a portable information terminal having power supply control functions and a power supply control method therefor.

2. Description of Related Art

Portable information terminals are used in most cases while being carried around, and portable batteries are mainly used for supplying electric power to such information terminals. Therefore, in addition to improvement of the battery capacity and miniaturization of the battery size, it is also desirable to provide, for example, a function for precisely measuring the remaining battery charge and informing it to users, and a function for performing various processing in accordance with the remaining battery charge.

Recently, various portable information terminals having a plurality of functions such as a radio communication function (for example, the same function as a portable telephone or a PHS (Personal Handyphone System)), an information processing function, and an image pick-up function such as those of digital cameras, are developed. Hereafter, such portable information terminals will obtain more complicated and advanced functions.

In a portable information terminal having several functions, since electric power consumption of each of circuits for performing respective functions are different from each other, it is difficult for users to predict the remaining battery life only based on the remaining battery charge. For example, although a function as a PDA (Personal Digital Assistant) can be activated for about several months by only one battery charging or battery exchange, a function as a portable telephone needs a battery charging once a week. Therefore, in a portable information terminal having both the functions, the operating time of the PDA function will be greatly shortened by the operation of the portable telephone function, and it is difficult for users to predict the remaining battery life.

SUMMARY OF THE INVENTION

The present invention is made in order to overcome the above drawbacks of the prior art, and the object of the present invention is to provide a portable information terminal which can restrict each function according to the remaining battery charge, and to provide a power supply control method therefor.

In order to achieve the above object, a portable information terminal of the present invention comprises a plurality of function processing units which respectively perform various functions; a battery which supplies electric power to the function processing units; a remaining battery charge detecting unit which detects remaining battery charge of the battery; and a power supply control unit which compares the remaining battery charge with each of power supply limiting values determined in advance with respect to the function processing units, and, when the remaining battery charge becomes lower than at least one of the power supply limiting values of the function processing units, stops power supply to the at least one of the function processing units and/or outputs warning signals.

According to the portable information terminal of the present invention, the operation of each of the function processing units such as a radio communication terminal unit, a data processing terminal unit, a digital camera unit, etc., is individually stopped, and/or warning signals are output, by comparing the present remaining battery charge with the power supply limiting values determined in advance with respect to each function processing unit. Therefore, it is possible to prevent the operating time of one function processing unit from being greatly shortened by the use of another function processing unit, and users can predict the remaining battery life for each of the function processing units.

The portable information terminal according to another aspect of the present invention comprises a plurality of function processing units which respectively perform various functions; a battery which supplies electric power to the function processing units; a CPU which controls the function processing units; a remaining battery charge detecting unit which detects remaining battery charge of the battery; and a processing control unit which compares the remaining battery charge with each of power supply limiting values determined in advance with respect to the function processing units, and, when the remaining battery charge becomes lower than at least one of the power supply limiting values of the function processing units, controls the CPU so that the CPU restricts the operation of the at least one of the function processing units.

In this case, when the present remaining battery charge value becomes smaller than the power supply limiting value of one function processing unit, the processing control unit instructs the CPU to perform the restriction of the one function processing unit. Thus, the electric power consumption for performing the one function processing unit can be decreased as well as the case where the power supply to the function processing unit is limited, and the processing control unit can function as well as the power supply control unit in the first aspect. The "restriction" may include completely stopping the function processing unit and partially stopping the function processing unit while maintaining the minimum functions of the function processing unit.

The power supply control method of the present invention is a method for controlling power supply to a portable information terminal having function processing units which respectively perform a plurality of functions, and the method comprises detecting a remaining battery charge of a battery which supplies electric power to the function processing units which respectively perform the functions; comparing the remaining battery charge with each of power supply limiting values determined in advance with respect to the function processing units; and when the remaining battery charge becomes lower than at least one of the power supply limiting values of the function processing units, stopping power supply to the at least one of the function processing units and/or outputting warning signals.

According to this method, the operation of each of the function processing units such as a radio communication terminal unit, a data processing terminal unit, a digital camera unit, etc., is individually stopped, and/or warning signals are output, by comparing the present remaining battery charge with the power supply limiting values determined in advance with respect to each function processing unit. Therefore, it is possible to prevent the operating time of one function processing unit from being greatly shortened by the use of another function processing unit, and users can predict the remaining battery life for each of the function processing units.

The power supply method according to another aspect of the present invention comprises detecting a remaining battery charge of a battery which supplies electric power to the function processing units; comparing the remaining battery charge with each of power supply limiting values determined in advance with respect to the function processing units; and when the remaining battery charge becomes lower than at least one of the power supply limiting values of the function processing units, controlling a CPU, which controls the function processing units, so as to restrict the operation of the at least one of the function processing units.

In this case, when the present remaining battery charge value becomes smaller than the power supply limiting value of one function processing unit, the processing control unit instructs the CPU to perform the restriction of the one function processing unit. Thus, the electric power consumption for performing the one function processing unit can be decreased as well as the case where the power supply to the function processing unit is limited, and the processing control unit can function as well as the power supply control unit in the previous aspect.

DETAILED DESCRIPTION OF THE INVENTION

Hereinafter, the preferred embodiments of the present invention will be explained referring to the figures.

Figure 1:
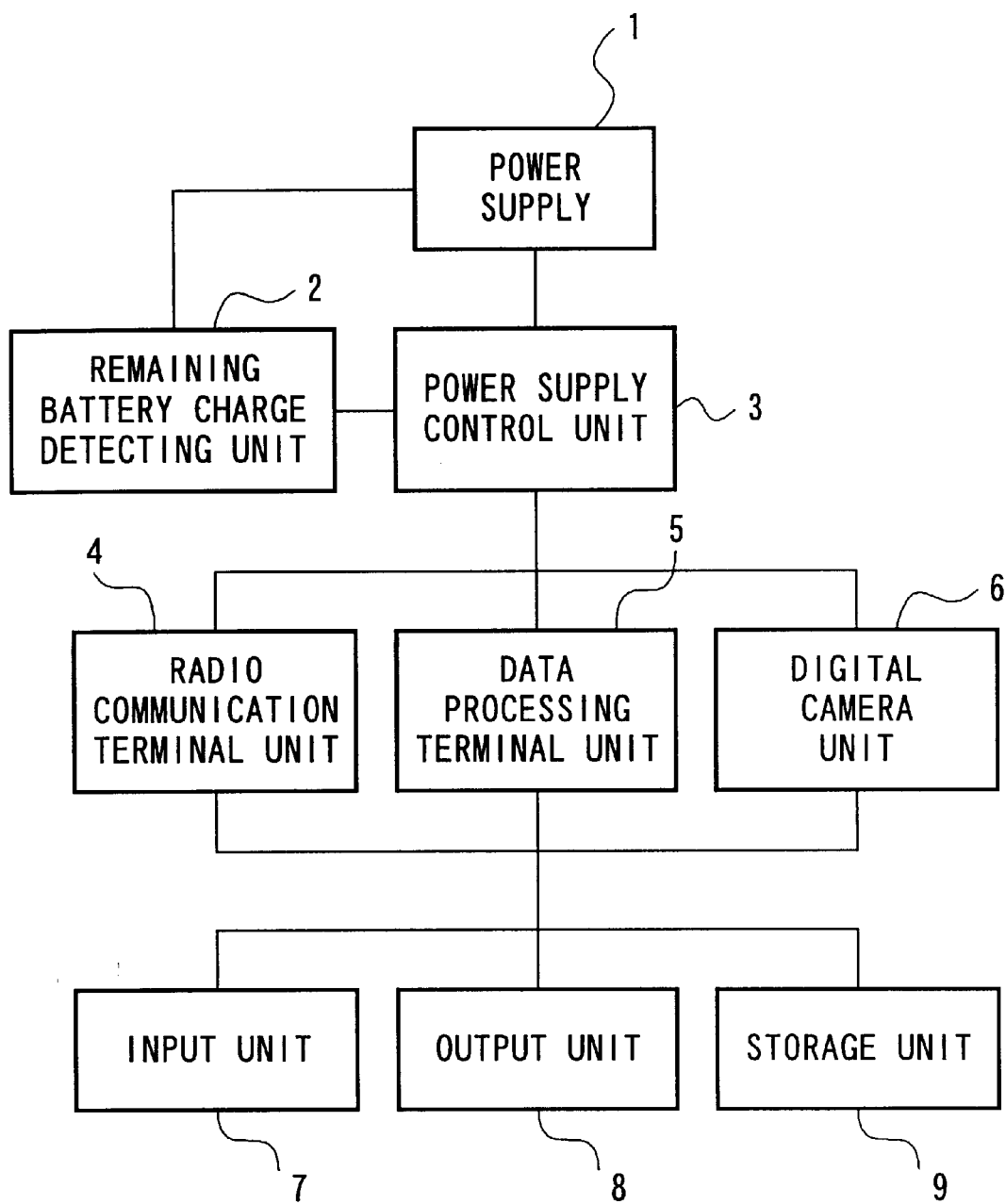
FIG. 1 is a block diagram illustrating a portable information terminal according to the first embodiment of the present invention.

FIG. 1 is a block diagram illustrating a portable information terminal according to the first embodiment of the present invention. This portable information terminal comprises a radio communication function, an information processing function, and an image pick-up function (digital camera function); however, the present invention is not limited to those functions but may comprise other various functions.

As shown in FIG. 1, this portable information terminal comprises a power supply source (battery) 1 such as a dry battery or a storage battery which can be recharged, and the battery 1 supplies electric power to every units in the portable information terminal. A remaining battery charge detecting unit 2 is connected to the battery 1. This remaining battery charge detecting unit 2 includes a timer, and detects the remaining battery charge of the battery 1 at regular intervals determined by the timer. A power supply control unit 3 is connected to the battery 1 and the remaining battery charge detecting unit 2. The power supply control unit 3 includes a memory for storing power supply limiting information for limiting power supply to each of the function processing units, and the power supply limiting information is input to the memory by users in advance. The power supply control unit 3 controls the power supply from the battery 1 to the function processing units based on the signals output from the remaining battery charge detecting unit 2.

The portable information terminal of the present embodiment comprises, as the function processing units, a radio communication terminal unit 4, a data processing terminal unit 5, and a digital camera unit 6. Each of the function processing units 4 to 6 respectively includes a CPU, a RAM, and a ROM storing procedure programs for performing the necessary function. In addition, the radio communication terminal unit 4 comprises signal processing unit and a radio transmitter-receiver including an antenna, and the digital camera unit 6 comprises an image pick-up device such as a CCD camera.

The portable information terminal further comprises an input unit 7, an output unit 8, and a storage unit 9. The input unit 7 is provided for inputting information by users, and comprises at least an input device such as a pen type input device (touch-pen), a keyboard, a mouse, etc. The information input via the input unit 7 will be transmitted to the radio communication terminal unit 4, the data processing terminal unit 5, and/or digital camera unit 6, in accordance with procedures to be performed.

The output unit 8 is provided for outputting information to the vision, the audition sense, or feeling of users, and comprises at least one display device such as a liquid crystal display, a speaker, a vibrator, etc.

The storage unit 9 is provided for storing data or information processed by the radio communication terminal unit 4, the data processing terminal unit 5, and the digital camera unit 6, and comprises at least one storage device such as a hard disk and a flash memory.

Figure 2:
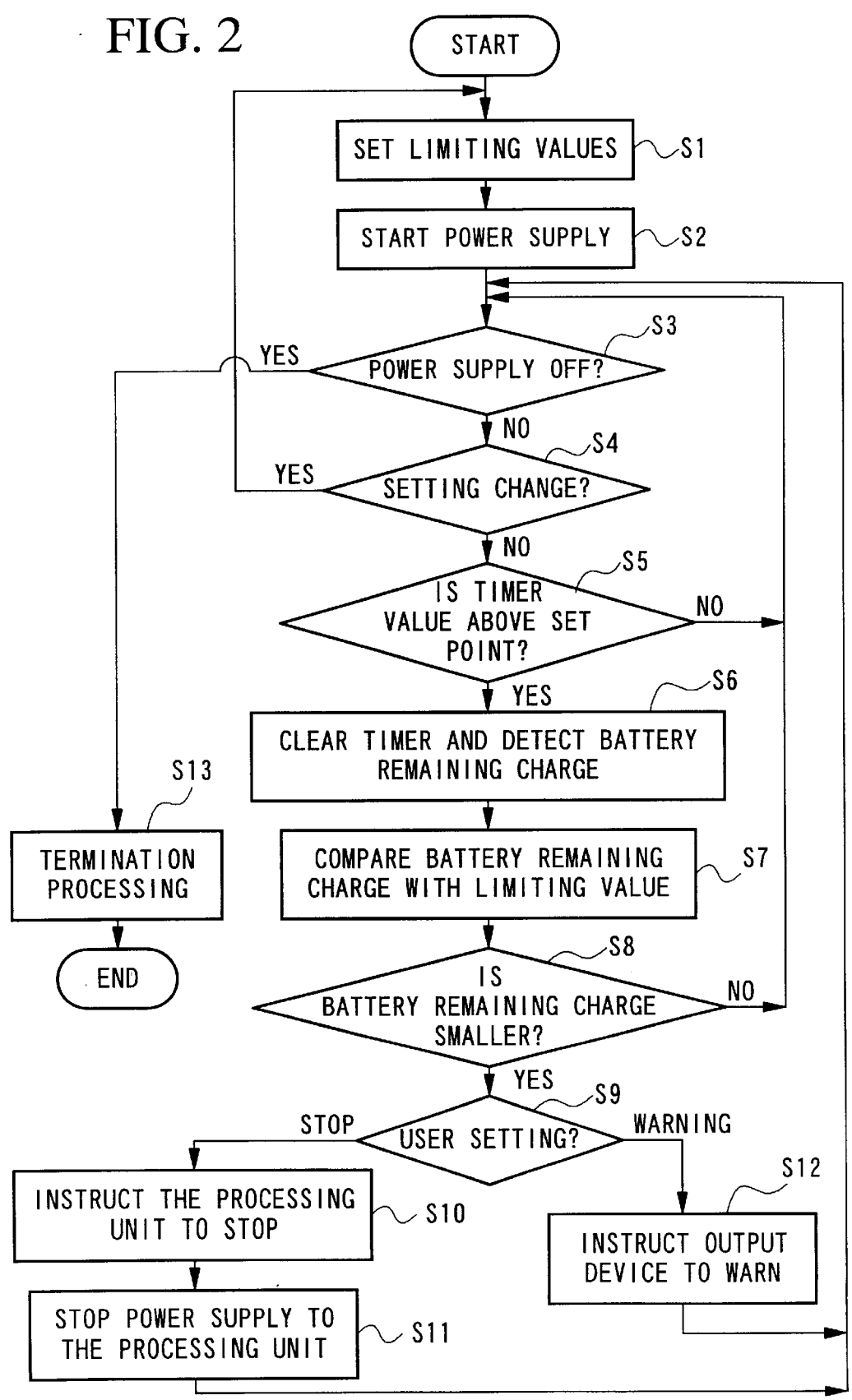
FIG. 2 is a flowchart illustrating the operation of the first embodiment.

Next, referring to FIG. 2, the operations of the portable information terminal shown in FIG. 1 will be explained. FIG. 2 is a flowchart illustrating the operation of the remaining battery charge detecting unit 2 and the power supply control unit 3. After the user turns on the power switch of the portable information terminal, in step S1, the user inputs the power supply limiting values by the input unit 7 with respect to each of the function processing units 4 to 6. The power supply limiting value is the remaining battery charge value for limiting the power supply to each of the function processing units 4 to 6, and when the remaining battery charge reaches to the power supply limiting value, the power supply to the corresponding unit is stopped, and/or a warning signal is generated to indicate to the user in order to inform that the remaining battery charge has decreased below the power supply limiting value. For example, the operation of the digital camera unit 6 is stopped when the remaining battery charge becomes 80% of the full battery charge, the operation of the data processing terminal unit 5 is stopped when the remaining battery charge becomes 50% of the full battery charge, and, further, the operations of the radio communication terminal unit 4 is stopped when the remaining battery charge becomes 20% of the full battery charge. In this case, the remaining battery charge values 80%, 50%, and 20% respectively correspond to the power supply limiting values of the digital camera unit 6, the data processing terminal unit 5, and the radio communication terminal unit 4. The power supply limiting values are determined as absolute values between 100% corresponding to the full battery charge state and 0% corresponding to the over discharge state, and the power supply limiting values are provided for each of all the function processing units 4 to 6.

The user can also select, using the input unit 7, the procedure to be performed with respect to each function processing unit when the remaining battery charge decreases below the power supply limiting value. Although the kinds of procedures are not limited in the present invention, in the present embodiment, "stopping" and "warning" can be selected as such procedures. When the "stopping" is selected by the user as the procedures to be performed with respect to one function processing unit, the power supply to the corresponding function processing unit is stopped when the remaining battery charge decreases below the power supply limiting value. On the other hand, when the "warning" is selected by the user as the procedures to be performed with respect to a function processing unit, a warning signal is indicated to the user by the output unit 8 in order to inform that the remaining battery charge has decreased below the power supply limiting value of the function processing unit.

Although the power supply limiting values are determined as the absolute values between 0 to 100% of the full battery charge in the above explanation, the power supply limiting value can be determined as the relative value based on the present remaining battery charge. For example, when the present remaining battery charge is 50% of the full battery charge and the relative power supply limiting value is determined to 50% of the present remaining battery charge, the power supply limiting value corresponds to the absolute remaining battery charge of 25%. By setting the power supply limiting values as relative values, regardless of the absolute value of the present remaining battery charge, it is possible to set the power supply control unit 3 so as to stop the function processing unit and/or to give the alarm when the remaining battery charge is reduced to, for example, 50% of the present remaining battery charge. Therefore, even when it is difficult to determine the power supply limiting values as the absolute values, it is easy to broadly input the power supply limiting values.

In step S2, the power supply control unit 3 starts to supply electric power to the function processing units 4 to 6. Next, in step S3, the power supply control unit 3 determines whether the power switch of the portable information terminal is turned off. If the power switch has been turned off, the flow proceeds to step S13, and the termination processes, which includes storing of the present setting information in the storage unit 9, is performed. Then, the flow ends.

If the power switch is turned on in step S3, the flow proceeds to step S4, and the power supply control unit 3 determines whether the power supply limiting values are changed by the user. If the power supply limiting value have been changed, the flow returns to step S1, and steps S2 to S4 are repeated while using the changed power supply limiting values. If the power supply limiting value has not been changed in step S4, the flow proceeds to step S5, and the remaining battery charge detecting unit 2 determines whether the present timer value, which is counted in the timer included in the remaining battery charge detecting unit 2, is compared with the predetermined set point. When the present timer value is smaller than the set point, the flow returns to step S3. The set point corresponds to the time interval for performing the detection of the remaining battery charge, and if the present timer value is larger than the set point, the flow proceeds to step S6. Therefore, the flow proceeds to step S6 at the constant intervals determined by the set point value.

In step S6, the remaining battery charge detecting unit 2 initializes the timer value, and detects the remaining battery charge of the battery 1. The remaining battery charge value is transmitted to the power supply control unit 3, and in step S7, the power supply control unit 3 compares the remaining battery charge value with each of the power supply limiting values for function processing units 4 to 6. Then, the power supply control unit 3 selects the function processing unit of which the power supply limiting value is smaller than the present remaining battery charge, if any. If there is no function processing unit of which the power supply limiting value is smaller than the present remaining battery charge, the flow returns to step S3.

In contrast, if there is at least one function processing unit of which the power supply limiting value is smaller than the present remaining battery charge, the flow proceeds to step S9, and the power supply control unit 3 retrieves the procedure set by the user for the function processing unit(s).

When the procedure set for the function processing unit(s) is "stopping", the flow proceeds to step S10, and the power supply control unit 3 commands to perform the termination processing of the selected function processing unit (in this embodiment, at least one of the radio communication terminal unit 4, the data processing terminal unit 5, and digital camera unit 6). After the termination processing of the selected function processing unit(s) is completed, the flow proceeds to step S11, and the power supply control unit 3 stops the power supply to the selected function processing unit(s).

On the other hand, when the procedure set for the function processing unit(s) is "warning", the flow proceeds to step S12, and the power supply control unit 3 instructs the selected function processing unit(s) to warn the user using the output unit 8. The warning may be given by various means such as display of images or characters on a display device, generation of sounds by a speaker, and/or generation of vibration by a vibration motor, etc., which can be set in advance in the power supply control unit 3 via the input unit 7 by the user. The procedures in steps S10 to S12 are performed in turns with respect to all the selected function processing units. When step S11 and/or S12 are completed for all the selected function processing units, the flow returns to step S3.

In this way, the remaining battery charge detecting unit 2 measures the remaining battery charge of the battery 1, and informs the measured value to the power supply control unit 3 at the predetermined intervals. Based on the remaining battery charge and the setting by the user, the power supply control unit 3 stops the function processing unit(s), and/or gives the alarm to the user. Therefore, in the present embodiment, it is possible to restrict the use of the function processing units in accordance with the remaining battery charge.

Figure 3:
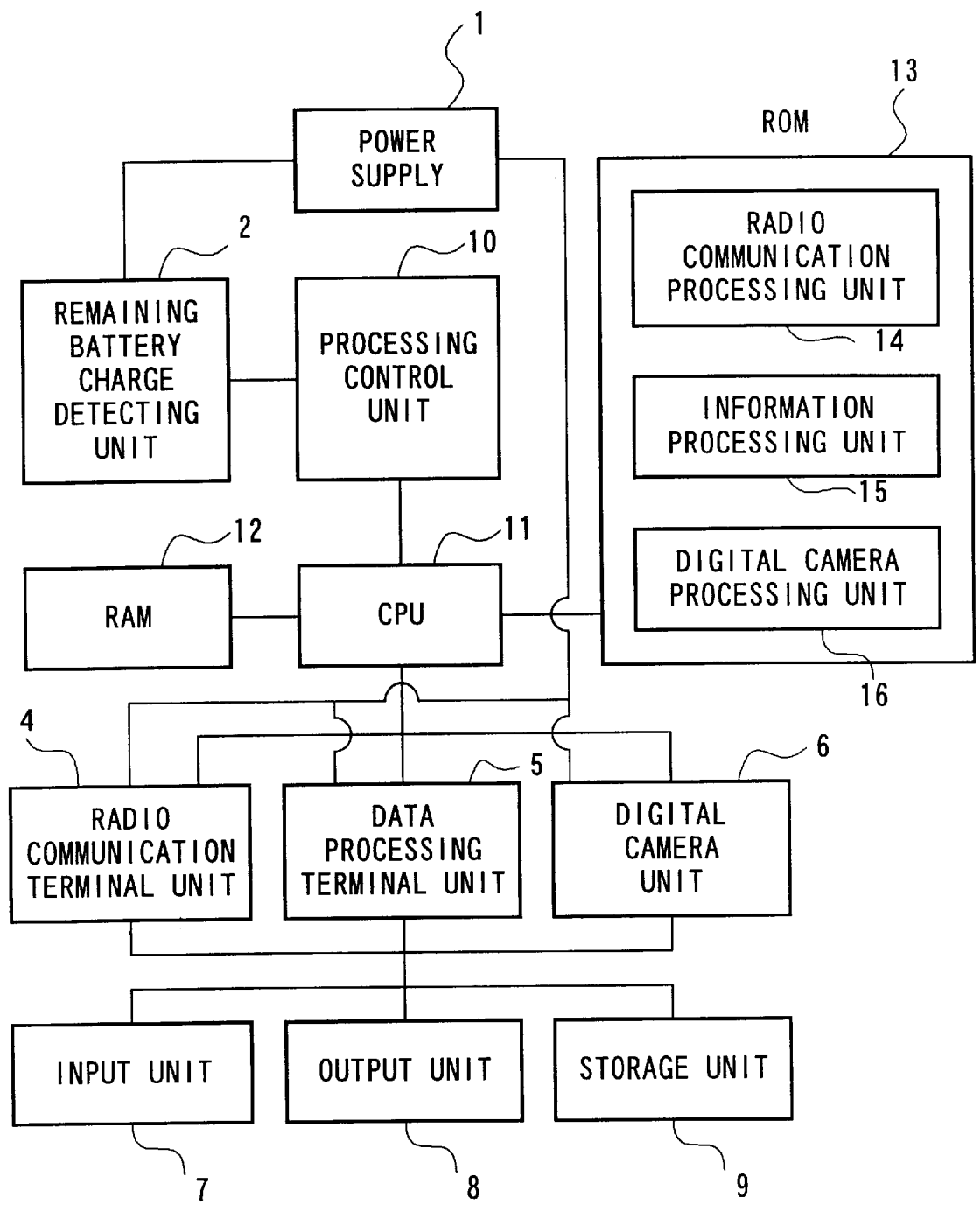
FIG. 3 is a block diagram illustrating a portable information terminal according to the second embodiment of the present invention.

Next, referring to FIG. 3, a second embodiment of the present invention will be explained. In FIG. 3, the elements which have the same functions as those in the first embodiment shown in FIG. 1 are attached with the same reference numbers as those in FIG. 1, and the explanations thereof will be omitted.

The first characteristic feature of the second embodiment is that the CPUs, the RAMs, and the ROMs of the function processing units 4 to 6 are respectively integrated in a CPU 11, a RAM 12, and a ROM 13. The ROM 13 includes a radio communication processing unit 14, an information processing unit 15, and a digital camera processing unit 16.

The second characteristic feature of the second embodiment is that the power supply control unit 3 is replaced with a processing control unit 10, and the battery 1 directly supplies the electric power to each of the function processing units (in this embodiment, the radio communication terminal unit 4, the data processing terminal unit 5, and the digital camera unit 6).

Although the operation of the second embodiment is performed basically in accordance with the flow shown in FIG. 2, it is different from that of the first embodiment in the following points.

In the case where the procedure for the function processing unit(s), of which the power supply limiting value is greater than the remaining battery charge value, is set as "stopping", if the present remaining battery charge value becomes smaller than the power supply limiting value in step S8 in FIG. 2, the flow proceeds via step S9 to step S10, and the processing control unit 10 instructs the CPU 11 to perform the restriction of the selected function processing unit. Here, the "restriction" includes completely stopping the function processing unit and partially stopping the function processing unit while maintaining the minimum functions of the function processing unit. For example, when the present remaining battery charge value becomes smaller than the power supply limiting value of the data processing terminal unit 5, the processing control unit 10 may forbid the CPU 11 to perform the function of the data processing terminal unit 5, or the processing control unit 10 may degrade the calculation speed of the CPU 11 for performing the function of the data processing terminal unit 5. Thus, the electric power consumption for performing the function of the data processing terminal unit 5 can be decreased as well as the case where the power supply to the function processing unit is limited, and the processing control unit 10 can function as well as the power supply control unit 3 in the first embodiment. Whether the function processing unit is completely stopped or is partially stopped can be selected by the user when the user inputs the power supply limiting values via the input unit 7.

In the first and second embodiments of the present invention, the power supply control unit 3 or the processing control unit 10 may be constructed so that the power supply limiting values of all the function processing units cannot be set below a predetermined minimum value, for example, 10% of the full battery charge. In these cases, because the remaining battery charge of the minimum value is left even after all the functions are restricted, it becomes possible to use the remaining battery charge in case of emergency.

Also, in the first and second embodiments, the power supply control unit 3 or the processing control unit 10 may be constructed so that the restriction of the operation of the function processing unit(s) can be temporarily cancelled by conducting a predetermined operation even when the remaining battery charge decreases below the power supply limiting value of the function processing unit(s). In those cases, it becomes possible to operate necessary function processing unit(s) even when the operation of the function processing unit is restricted.

Furthermore, the above two types of the modifications can be combined. That is, the power supply control unit 3 or the processing control unit 10 may be constructed so that the power supply limiting values of all the function processing units cannot be set below a predetermined minimum value, and the restriction of the operation of the function processing unit(s) can be temporarily cancelled by conducting a predetermined operation. In this case, even when the operations of all the function processing units 4 to 6 are stopped or restricted, by means of performing the predetermined operation using the input unit 7, it becomes possible to use a necessary function processing unit. Therefore, for example, in the emergency cases such as when it is necessary to call the police or call for an ambulance, by performing the predetermined operation, it becomes possible to use the radio communication terminal unit 4 as a portable telephone while consuming the remaining battery charge. Thus, it is possible to prevent problems that the portable information terminal cannot be used in the emergency cases.

Although each of the above embodiments comprises radio communication terminal unit 4, the data processing terminal unit 5, the digital camera unit 6, the present invention is not limited to these embodiments, and the portable information terminal of the present invention may comprises two function processing units or four or more function processing units including another types of function processing units. Even in the case where four or more function processing units are provided, the function processing units can be controlled in a similar manner with the above embodiments.

What is claimed is:

1. A portable information terminal having a plurality of functions, comprising:
   a plurality of function processing units, each function processing unit performing one of the functions;
   a battery which supplies electric power to the function processing units;
   a remaining battery charge detecting unit which detects remaining battery charge of the battery;
   a power supply control unit which compares the remaining battery charge with each of power supply limiting values determined in advance with respect to the function processing units; and
   an input unit for inputting a procedure to follow when the remaining battery charge becomes lower than at least one of the power supply limiting values of the function processing units, said procedure comprising at least one of stopping said power supply to at least one of the function processing units and outputting warning signals.

2. The portable information terminal according to claim 1, wherein said input unit comprises a user input setting.

3. The portable information terminal according to claim 1, wherein said power supply control unit retrieves said procedure for said function processing units.

4. The portable information terminal according to claim 1, wherein said function processing units comprise at least one of a radio communication terminal unit, a data processing terminal unit, and an image pick-up unit.

5. The portable information terminal according to claim 1, wherein said power supply control unit comprises a memory for storing said power supply limiting values.

6. The portable information terminal according to claim 1, wherein said power supply control unit controls a power supply from said battery to said function processing units based on signals outputted from said remaining battery charge detecting unit.

7. The portable information terminal according to claim 1, wherein said power supply limiting values comprise an operational range of 20% to 80% of a full battery charge.

8. The portable information terminal according to claim 1, wherein said power limiting values for each of said function processing units are inputted via said input unit.

9. The portable information terminal according to claim 1, wherein said power supply limiting values comprise a relative value based on said remaining battery charge.

10. The portable information terminal according to claim 1, further comprising:
    an output unit for providing said warning signals,
        wherein said warning signals comprise at least one of an image display warning signal, an audio warning signal and a vibrational warning signal.

11. The portable information terminal according to claim 1, wherein said power supply control unit inputs an instruction for performing a predetermined operation which temporarily cancels said operation of at least one of said function processing units.

12. The portable information terminal according to claim 1, wherein said stopping of said power supply comprises at least one of completely and partially stopping said power supply to at least one of said function processing units in order to maintain a minimum function of at least one of said function processing units.

13. The portable information terminal according to claim 1, wherein said power supply limiting values comprise at least 10 percent of said battery having 100% charge.

14. The portable information terminal according to claim 1, wherein said processing control unit inputs an instruction for performing a predetermined operation which temporarily cancels said operation of at least one of said function processing units.

15. A portable information terminal having a plurality of functions, comprising:

a plurality of function processing units, each function processing unit performing one of the functions;

a battery which supplies electric power to the function processing units;

a CPU which controls the function processing units;

a remaining battery charge detecting unit which detects remaining battery charge of the battery;

a processing control unit which compares the remaining battery charge with each of power supply limiting values determined in advance with respect to the function processing units; and an input unit for inputting a procedure to follow when the remaining battery charge becomes lower than at least one of the power supply limiting values of the function processing units, said procedure comprising controlling the CPU so that the CPU restricts the operation of at least one of the function processing units.

16. The portable information terminal according to claim 15, wherein said power supply limiting values are inputted via said input unit.

17. A power supply control method for a portable information terminal having function processing units, each function processing unit performing one of a plurality of functions, comprising:

detecting a remaining battery charge of a battery which supplies electric power to the function processing units;

comparing the remaining battery charge with each of power supply limiting values determined in advance with respect to the function processing units; and inputting a procedure to follow when the remaining battery charge becomes lower than at least one of the power supply limiting values of the function processing units, said procedure comprising at least one of stopping said power supply to at least one of the function processing units and outputting warning signals.

18. A power supply control method for a portable information terminal having function processing units, each function processing unit performing one of a plurality of the functions, comprising:

detecting a remaining battery charge of a battery which supplies electric power to the function processing units;

comparing the remaining battery charge with each of power supply limiting values determined in advance with respect to the function processing units; and inputting a procedure to follow when the remaining battery charge becomes lower than at least one of the power supply limiting values of the function processing unit, said procedure comprising controlling a CPU, which controls the function processing units, so as to restrict the operation of at least one of the function processing units.

* * * * *